US011353002B2

(12) United States Patent
Meeks et al.

(10) Patent No.: US 11,353,002 B2
(45) Date of Patent: Jun. 7, 2022

(54) MULTI SEGMENT WIND TURBINE BLADE JOINT BUSHING

(71) Applicant: Roller Bearing Company of America, Inc., Oxford, CT (US)

(72) Inventors: Ryan Meeks, Mission Viejo, CA (US); Jarrod McGuire, Murrieta, CA (US); Elizabeth Westbrook, Pleasanton, CA (US)

(73) Assignee: Roller Bearing Company of America, Inc., Oxford, CT (US)

(*) Notice: Subject to any disclaimer, the term of this patent is extended or adjusted under 35 U.S.C. 154(b) by 0 days.

(21) Appl. No.: 16/742,192

(22) Filed: Jan. 14, 2020

(65) Prior Publication Data

US 2020/0224636 A1   Jul. 16, 2020

Related U.S. Application Data

(60) Provisional application No. 62/793,007, filed on Jan. 16, 2019.

(51) Int. Cl.
| *F03D 1/06*    | (2006.01) |
| *F16C 33/20*   | (2006.01) |
| *B29L 31/08*   | (2006.01) |
| *F16C 23/04*   | (2006.01) |

(52) U.S. Cl.
CPC .......... *F03D 1/0675* (2013.01); *F16C 33/201* (2013.01); *B29L 2031/085* (2013.01); *F05B 2230/60* (2013.01); *F05B 2240/302* (2013.01); *F05B 2280/6003* (2013.01); *F16C 23/045* (2013.01); *F16C 2208/32* (2013.01)

(58) Field of Classification Search
CPC .. F16C 33/201; F16C 2208/32; F16C 23/045; F03D 1/065; F03D 1/0633; F03D 1/0641; F03D 1/0675; B29L 2031/085; F05B 2230/60; F05B 2240/302; F05B 2280/6003
See application file for complete search history.

(56) References Cited

U.S. PATENT DOCUMENTS

| 3,655,226 A  | 4/1972 | Cowan |
| 4,389,162 A  | 6/1983 | Doellinger et al. |
| 7,654,799 B2 | 2/2010 | Eyb |
| 8,171,633 B2 | 5/2012 | Zirin et al. |
| (Continued) |

FOREIGN PATENT DOCUMENTS

| CN | 1259599 A   | 7/2000 |
| CN | 202971580 U | 6/2013 |
| (Continued) |

OTHER PUBLICATIONS

Extended European Search Report issued in corresponding EP Application No. 20152007.9, dated Jun. 5, 2020, pp. 1-11.

*Primary Examiner* — Brian P Wolcott
*Assistant Examiner* — Sang K Kim
(74) *Attorney, Agent, or Firm* — Murtha Cullina LLP

(57) ABSTRACT

A joint bushing that accommodates the dithering and sliding in multi segment wind turbines. The joint bushing includes a self-lubricating liner that is a composite system incorporating woven Polytetrafluoroethylene fibers intermixed with structural reinforcement fibers in a composite matrix. The composite system provides sufficient life without requiring re-lubrication.

15 Claims, 14 Drawing Sheets

(56) References Cited

U.S. PATENT DOCUMENTS

| | | |
|---|---|---|
| 9,309,924 B2 | 4/2016 | Corts |
| 9,388,789 B2 | 7/2016 | Hibbard et al. |
| 9,945,356 B2 | 4/2018 | Humblot et al. |
| 9,995,271 B2 | 6/2018 | Dahl et al. |
| 10,071,532 B2 | 9/2018 | Caruso et al. |
| 10,393,179 B2 * | 8/2019 | Charmillot .............. F16C 33/60 |
| 2003/0231814 A1 * | 12/2003 | Fidziukiewicz ........ F16C 17/02 384/276 |
| 2011/0142675 A1 | 6/2011 | Van Der Bos |
| 2012/0058923 A1 * | 3/2012 | Hamel .................... F16C 17/02 508/106 |
| 2016/0084302 A1 * | 3/2016 | Spinella ................ F16C 27/063 384/297 |
| 2018/0171968 A1 | 6/2018 | Hunter |
| 2018/0223796 A1 | 8/2018 | Yarbrough et al. |
| 2018/0274521 A1 | 9/2018 | Akhtar et al. |
| 2018/0340510 A1 * | 11/2018 | Huth .................... F03D 1/0675 |
| 2019/0040842 A1 | 2/2019 | Yarbrough et al. |
| 2019/0338750 A1 | 11/2019 | Bech |

FOREIGN PATENT DOCUMENTS

| | | |
|---|---|---|
| WO | 2005064156 A1 | 7/2005 |
| WO | 2015011291 A1 | 1/2015 |
| WO | 2015051803 A1 | 4/2015 |
| WO | 2018015647 A1 | 1/2018 |
| WO | 2019120417 A1 | 6/2019 |
| WO | 2019219139 A1 | 11/2019 |
| WO | 2019228906 A1 | 12/2019 |

* cited by examiner

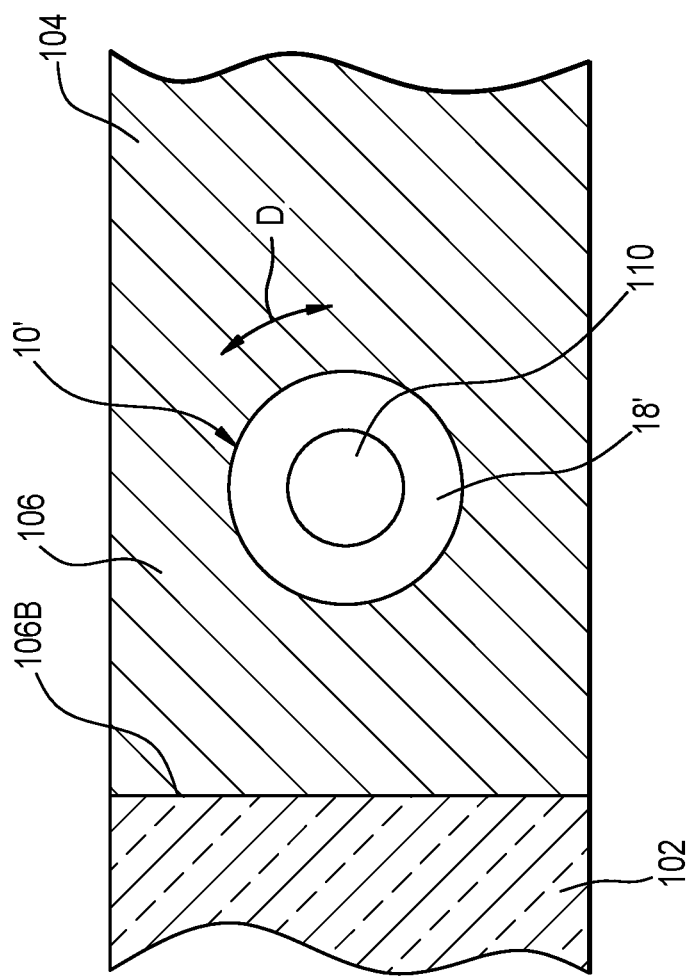

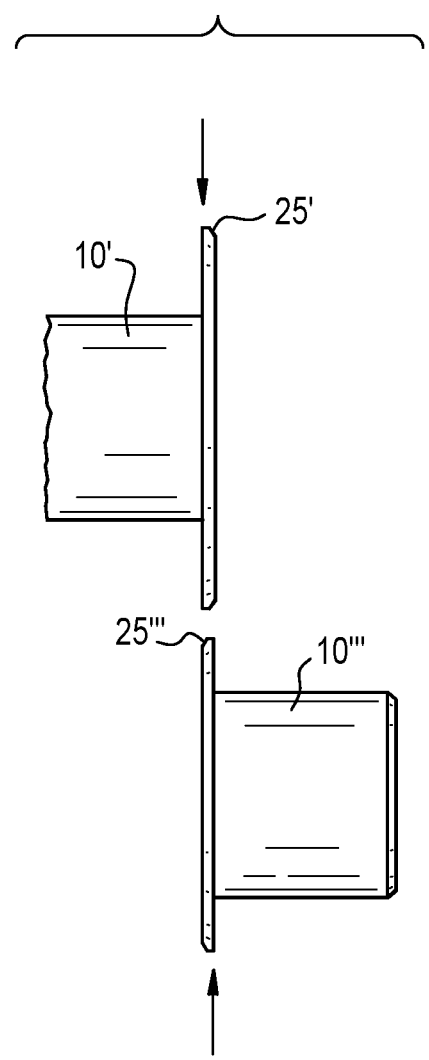
FIG. 8C1

MULTI SEGMENT WIND TURBINE BLADE JOINT BUSHING

CROSS REFERENCE TO RELATED APPLICATION

This application claims the benefit of U.S. Provisional Patent Application Ser. No. 62/793,007 filed on Jan. 16, 2019, which is incorporated herein by reference in its entirety.

TECHNICAL FIELD

The present invention is directed to a self-lubricating joint bushing for use in wind turbine blades that incorporate two or more separate segments.

BACKGROUND

Typical blades on wind turbines are made in one continuous piece, these blades are exceptionally large and are difficult to manufacture and transport due to their extreme size.

Two piece blades are not practical for wind turbine applications because once the turbine blade is installed into its permanent location, inspection and/or re-lubrication of greased bushings or bearings employed to connect the two segments is unreasonable, dangerous and in some cases impossible. Inspection and/or lubrication of this joint would need to be done in situ, where the turbine blade joint would be as much as several hundred feet off the ground, and located in a concealed position.

SUMMARY

There is disclosed herein a bushing for a segmented wind turbine blade. The bushing includes a tubular segment having an inside surface extending from a first axial end to a second axial end thereof. The bushing includes a self-lubricating liner having a mounting surface and a bearing surface. The mounting surface is adhered to the inside surface of the tubular segment. The self-lubricating liner is configured to withstand dithering and rotational sliding between the liner and a shaft extending therethrough.

In one embodiment, the self-lubricating liner withstands dithering of about 4 degrees.

In one embodiment, a thrust component extends radially outward from and circumferentially around the first axial end.

In one embodiment, the thrust component is a first flange formed integrally with the tubular segment.

In one embodiment, the self-lubricating liner includes a composite system incorporating plurality of woven polytetrafluoroethylene fibers intermixed with structural reinforcement fibers and encapsulated within a polymer matrix.

In one embodiment, the self-lubricating liner includes a dither accommodating concentration of polytetrafluoroethylene fibers proximate the bearing surface.

In one embodiment, the self-lubricating liner includes a strength accommodating concentration of structural reinforcement fibers proximate the mounting surface.

In one embodiment, the bushing includes a second thrust component (e.g., flange) extending radially inward from the second axial end.

In one embodiment, the second thrust component defines a mounting aperture extending axially therethrough.

In one embodiment, the bushing includes a circumferential groove penetrating the inside surface of the tubular segment.

In one embodiment, the bushing includes a threaded end on the inside surface of the tubular segment. A threaded plug is inserted in the threaded end to retain the shaft in the assembly.

In one embodiment, the threaded plug has a lubricated surface to reduce friction and wear in the assembly In one embodiment, locking features, including wire or pins, are used to retain the end pin in the bushing.

There is further disclosed herein a segmented wind turbine blade that includes a first segment that has a channel, a first support leg formed at an end of the first segment, and a support aperture penetrating the first support leg. The wind turbine blade includes a second segment that has a tongue extending from an end of the second segment. The tongue is complementary in shape to the channel and is disposed in the channel. The tongue has a bore extending therethrough. A bushing is disposed in the support aperture. A mounting shaft extends through the bore and has an end that is disposed in the bushing. The mounting shaft couples the second segment to the first segment. The bushing has a self-lubricating liner secured to an inside surface thereof. The self-lubricating liner is configured to withstand dithering and rotational sliding between the self-lubricating liner and the support shaft extending therethrough.

In one embodiment, the self-lubricating liner has a mounting surface and a bearing surface and the mounting surface is adhered to the inside surface of the tubular segment.

There is also disclosed herein a segmented wind turbine blade having a first segment, a second segment, a first bushing, a second bushing, a third bushing, a fourth bushing and a mounting shaft. A channel is formed in a first end of the first segment, forming a first support leg and a second support leg on either side of the channel. The first segment has a first support aperture penetrating the first support leg and a second support aperture penetrating the second support leg. The first support aperture is aligned with the second support aperture. The second segment has a tongue extending from a first tongue end to a second tongue end. The tongue is complementary in shape to the channel and the tongue is disposed in the channel. The tongue has a bore extending from a first tongue side to a second tongue side. The first bushing is disposed in the first support aperture. The first bushing has a tubular segment with an inside surface extending from a first axial end to a second axial end. A first circumferential groove penetrates the inside surface of the tubular segment. The second bushing is disposed in the bore proximate to the first tongue side. The third bushing is disposed in the bore proximate to the second tongue side. The fourth bushing is disposed in the second support aperture. The fourth bushing has a tubular segment with an inside surface extending from a first axial end to a second axial end and the fourth bushing has a second flange extending radially inward from the second axial end of the inside surface. The mounting shaft is disposed in the first support aperture, the bore and the second support aperture. The mounting shaft has an exterior surface extending from a first end that is disposed in the first bushing to a second end that is disposed in the fourth bushing. A second circumferential groove penetrates the exterior surface of the mounting shaft proximate to the first end. The mounting shaft couples the second segment to the first segment. A collapsible ring engages the first circumferential groove and the second circumferential groove to axially secure the first end of the shaft to the first support and the second flange engages the second end of the shaft to axially secure the second end of the shaft to the second support.

BRIEF DESCRIPTION OF THE DRAWINGS

FIG. 3 is front cut away view of the turbine blade according to an embodiment;

FIG. 8C1 is an illustration of the assembly of two bushings.

DETAILED DESCRIPTION

Figure 1A:
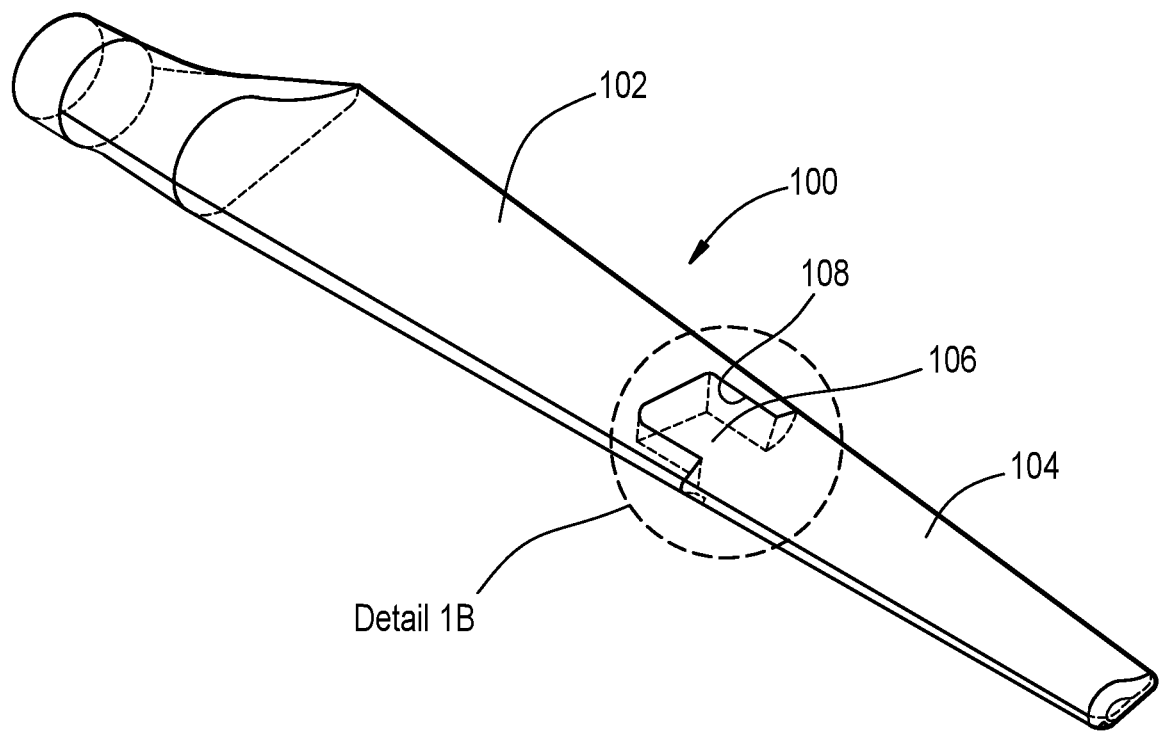
FIG. 1A is an isometric view of a wind turbine blade incorporating a joint bushing according to the present disclosure.
Figure 1B:
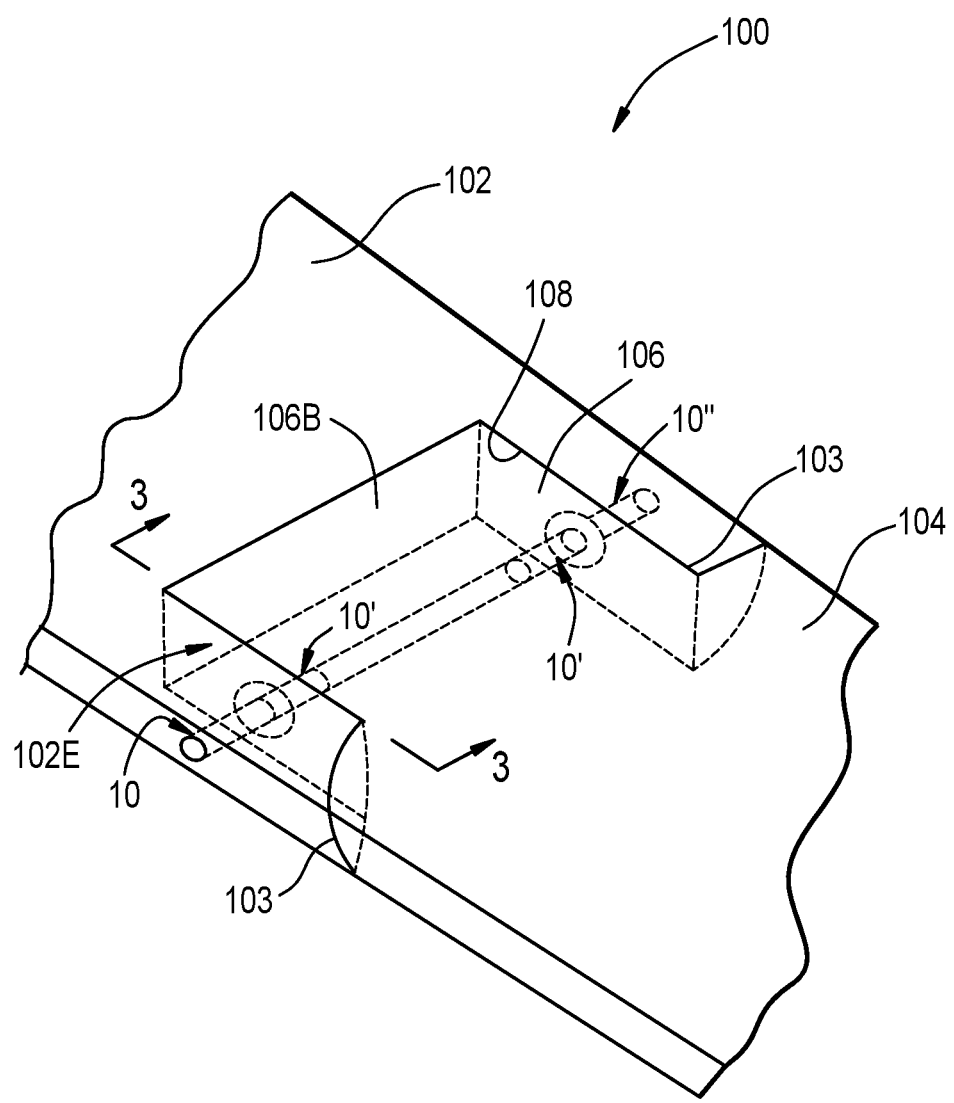
FIG. 1B is an enlarged view of detail 1B of FIG. 1A with a mounting shaft and the joint bushings depicted in phantom.
Figure 1C:
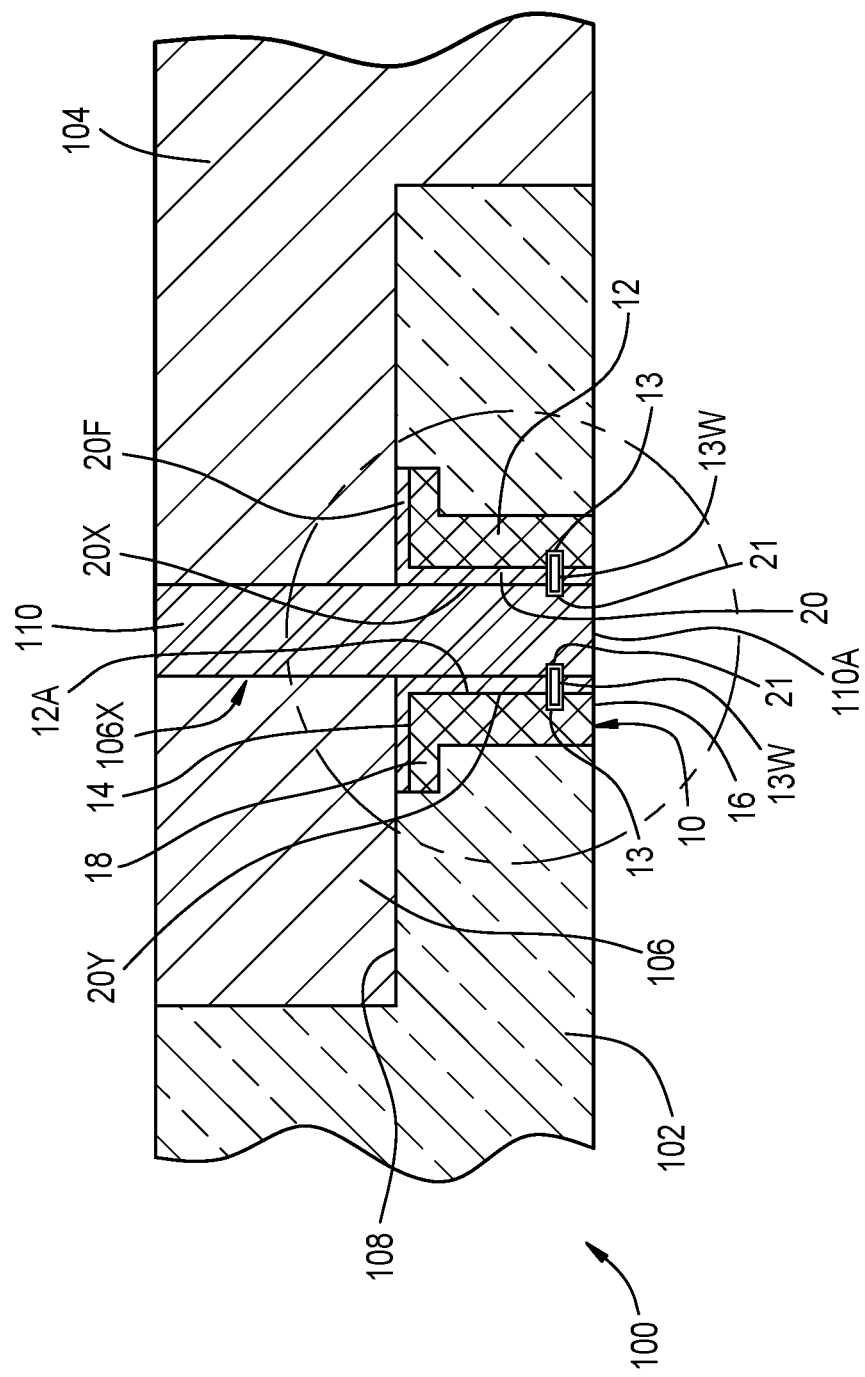
FIG. 1C is cross sectional view of a portion of the turbine blade according to an embodiment, taken along the center of the mounting shaft.
Figure 1D:
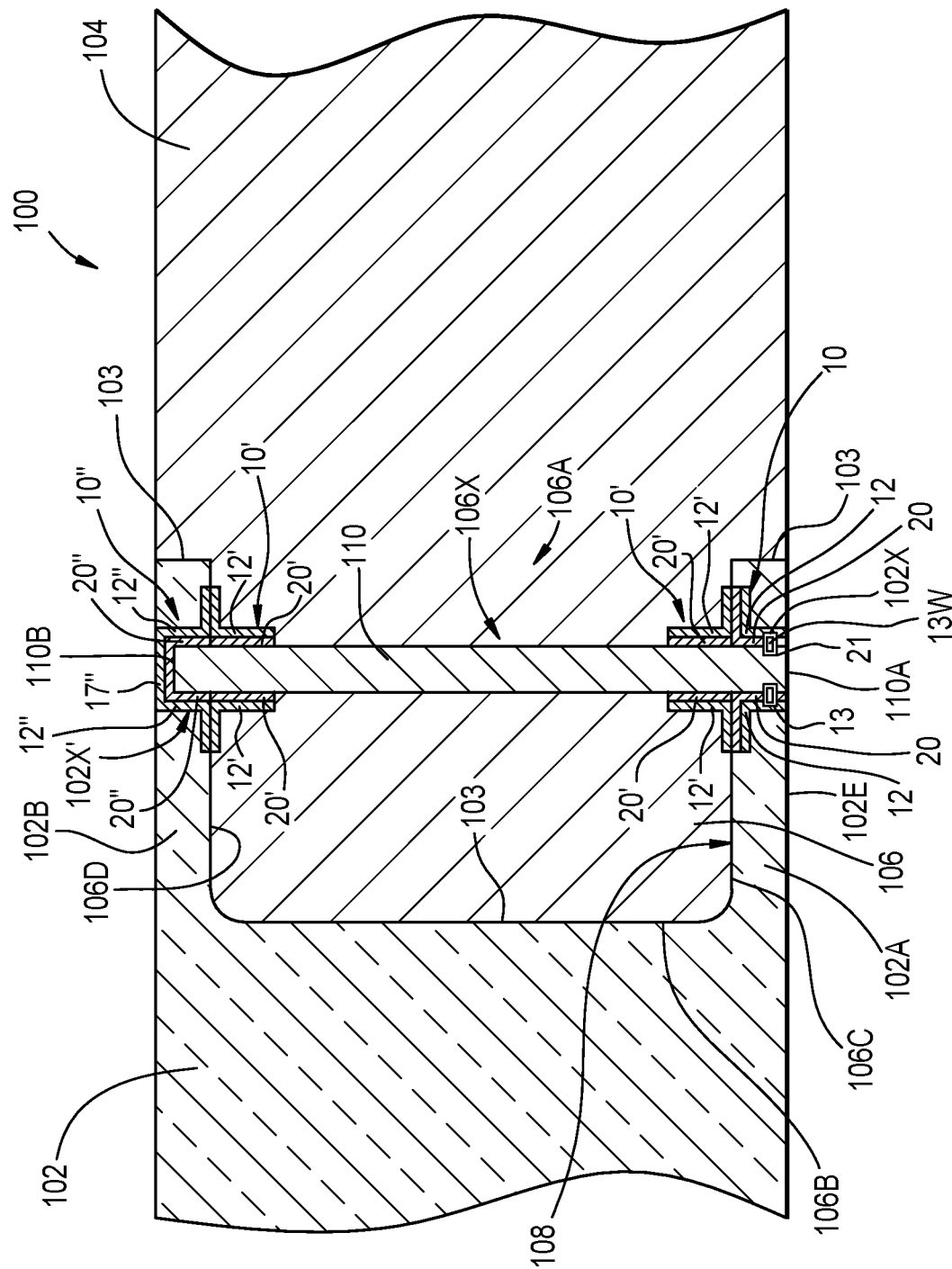
FIG. 1D is a cross sectional view of portion of the turbine blade according to an embodiment, taken along the center of the mounting shaft.

As shown in FIGS. 1A, 1B and 1D, a wind turbine blade 100 includes a first segment 102 and a second segment 104. A tongue 106 extends from the second segment 104 at a first tongue end 106A to a second tongue end 106B. The tongue 106 mates with (i.e., is disposed in) a complementary channel (e.g. a groove) 108 in the first segment 102. A mounting shaft 110 (as depicted in FIG. 1D) penetrates the first segment 102 via a first support aperture 102X (e.g., a bore) that extends inwardly from an edge 102E of the first segment 102. The tongue 106 has a bore 106X extending therethrough that is coaxial with the first support aperture 102X. A joint bushing 10' is disposed in the bore 106X. The joint bushing 10' has a tubular segment 12' that is coaxial with the bore 106X and the first support aperture 102X. The mounting shaft 110 (e.g., a support rod) is disposed in the first support aperture 102X and extends into an interior area the tubular segment 12' of the joint bushing 10'. The mounting shaft 110 couples the second segment 104 to the first segment 102 along a seam 103 therebetween by fixing the tongue 106 in the channel 108. In some embodiments, multiple shafts and joint bushings are incorporated into a single wind turbine blade.

The joint bushing 10, 10', 10'', 10''', 210 disclosed herein is configured to carry significant loads exceeding 5000 pounds per square inch with tight compliance, high rigidity, and limited running clearances. In some embodiments, the running clearance is between 0.001 and 0.010 inches. The bushing 10, 10', 10'', 10''', 210 has a self-lubricating liner 20, 20', 20'', 20', 120 secured thereto which is configured to accommodate dithering caused by relative movement between the first segment 102 and the second segment 104. The bushing 10', 10'', 10''', 210 is configured to withstand dithering, or frequent low magnitude rotations of approximately ±2° (as shown by the arrow D in FIG. 3). Dithering occurs when high frequency, low magnitude motion contributes to microscopic wear that eventually causes macroscopic failure due to lack of lubrication. Dithering particularly affects the bond between the bushing 10, 10', 10'', 10''', 210 and the liner 20, 20', 20'', 20''', 120, causing the liner 20, 20', 20'', 20''', 120 to fatigue and eventually disband from the mating surface with the bushing 10, 10', 10'', 10''', 210. The self-lubricating liner 20, 20', 20'', 20', 120 permits less than 0.015" of wear after over 7 million cycles of the mounting shaft 110 within the joint bushing 10, 10', 10'', 10''', 210. Referring to FIG. 1D, the shaft 110 is retained within the first segment 102 and the second segment 104 of the wind turbine blade 100 by four bushings 10, 10', 10' and 10''. The channel 108 of the first segment 102 forms a first support leg 102A and a second support leg 102B on either side of the channel 108. A first support aperture 102X penetrates the first support leg 102A and a second support aperture 102X' penetrates the second support leg 102B. The first support aperture 102X is aligned with the second support aperture 102X'. The tongue 106 of the second segment 104 extends from a first tongue end 106A to a second tongue end 106B. The tongue 106 is complementary in shape to the channel 108 and the tongue 106 is disposed in the channel 108. The tongue 106 has a bore 106X extending from a first tongue side 106C to a second tongue side 106D. The shaft 110 extends from a first end 110A proximate to the edge 102E of the first segment 102 in the first support aperture 102X of the first support leg 102A through the bore 106X in the tongue 106 and to an opposite second end 110B in the second support aperture 102X' in the second support leg 102B. The first end 110A of the shaft 110 is radially retained by a bushing 10 disposed within the first support aperture 102X in the first segment 102. A lock washer 13W engages an inner groove 13 in the bushing 10 and an outer groove 21 in the shaft 110 to axially retain the shaft 110, as discussed in detail below. The second end 110B of the shaft 110 is radially retained by a bushing 10'' disposed within a second support aperture 102X' in the first segment 102. A second flange 17'' of the bushing 10'' axially retains the shaft 110, as discussed in detail below. A bushing 10' is disposed in the bore 106X at both the first tongue side 106C and the second tongue side 106D. The bushings 10', 10' radially retain the shaft 110. In the embodiment depicted in FIGS. 8A-8D, the first end 110A is axially retained by a bushing 10''' in cooperation with a threaded plug 13P, as discussed in detail below.

Figure 2:
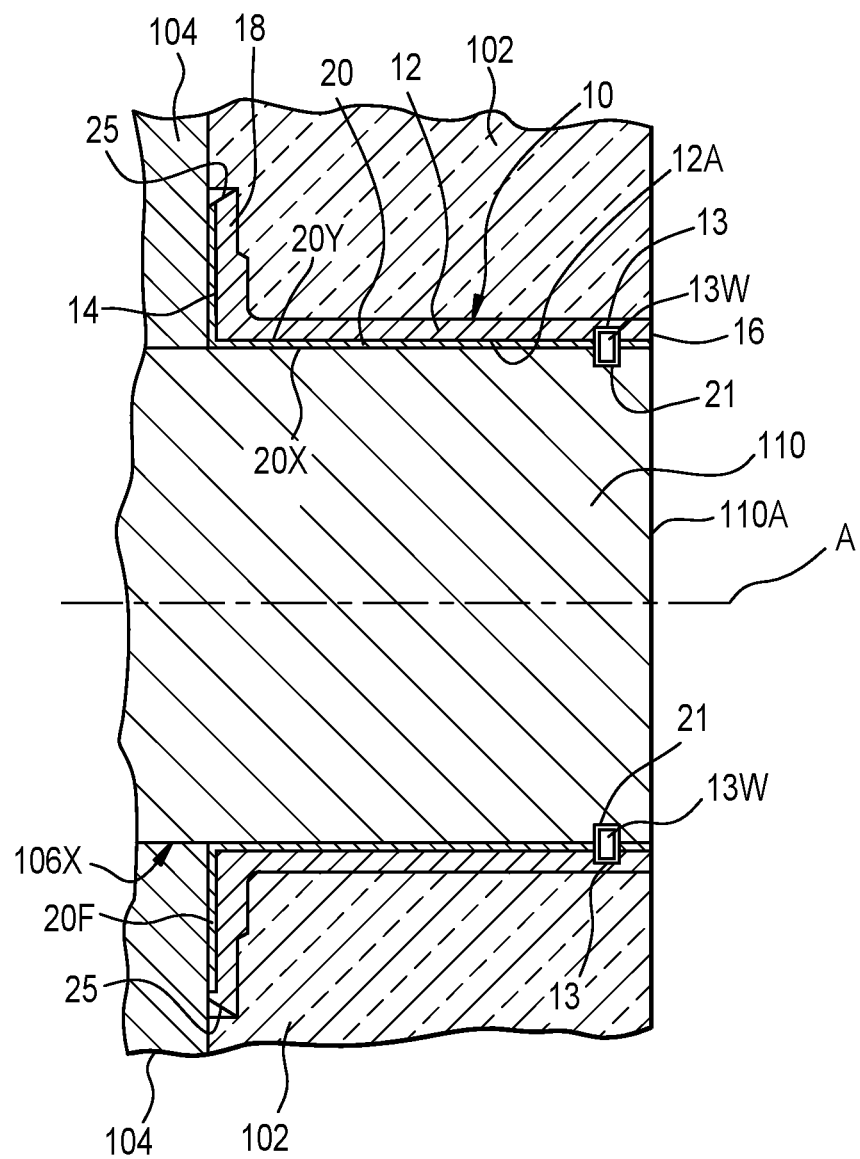
FIG. 2 is a side sectional view of a portion of the turbine blade according to an embodiment of the present disclosure.

Referring to FIGS. 2 and 3, the joint bushing 10 has the tubular segment 12 extending from a first axial end 14 to a second axial end 16 thereof. In some embodiments, the bushing 10 includes a flange 18 (e.g., a thrust component) extending radially outwardly from the tubular segment 12 at the first axial end 14, away from a central axis A. In one embodiment, the flange 18 is integral with the tubular segment 12. The flange 18 resists thrust loads on the joint bushing 10 and allows for small rotations and/or translations while limiting extraneous components in the system. An exterior circumferential surface of the self-lubricating liner 20 defines a mounting surface 20Y that is mounted (e.g., adhered) to an inside surface 12A of the tubular segment 12. An interior circumferential surface of the self-lubricating liner 20 defines a bearing surface 20X. The bearing surface 20X surrounds the mounting shaft 110 and accommodates rotation of the mounting shaft 110 therein. A portion 20F of the self-lubricating liner 20 extends over the flange 18 extending radially outward from the first axial end 14 of the tubular segment 12. The portion 20F self-lubricating liner 20 slidingly engages a side wall of the channel 108 to accommodate and withstand the dithering. In the embodiment shown in FIG. 4B, the self-lubricating liner 20 attaches to a tubular segment 12 of the joint bushing 10. In the embodiment depicted in FIGS. 2-3, the self-lubricating liner 20 withstands dithering of about 4 degrees.

While the flange 18 (e.g., a thrust component) is shown and described as extending radially outwardly from the tubular segment 12 at the first axial end 14, the present invention is not limited in this regard as the flange 18 may be replaced with a separate thrust washer 118 as shown and described with reference to FIG. 7. While the portion 20F of the self-lubricating liner 20 is shown in FIG. 2 as extending over the flange 18, the present invention is not limited in this regard, in some embodiments, there is no self-lubricating liner extending over the flange 18.

As shown in FIG. 2, an inner groove 13 penetrates the self-lubricating liner 20 and the inside surface 12A of the tubular segment 12. The inner groove 13 accommodates a split lock washer 13W or other form of a collapsible ring to provide an axial and/or radial retention surface for mating the bushing 10 with the shaft 110. In one embodiment, the split lock washer 13W mates with an outer groove 21 of the shaft 110 to axially retain the shaft 110 within the bushing 10. An outer edge of the flange 18 has a chamfer 25.

Figure 8A:
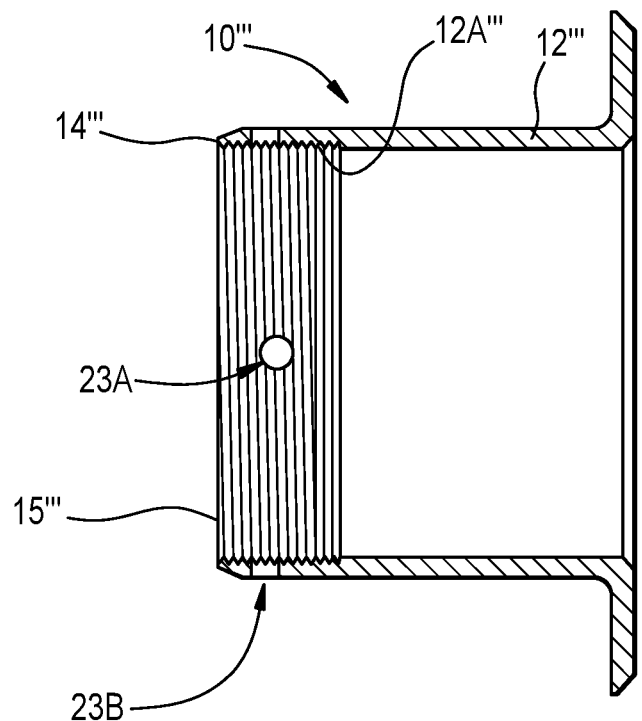
FIG. 8A is a side sectional view of an alternate embodiment of a joint bushing according to the present disclosure.
Figure 8B:
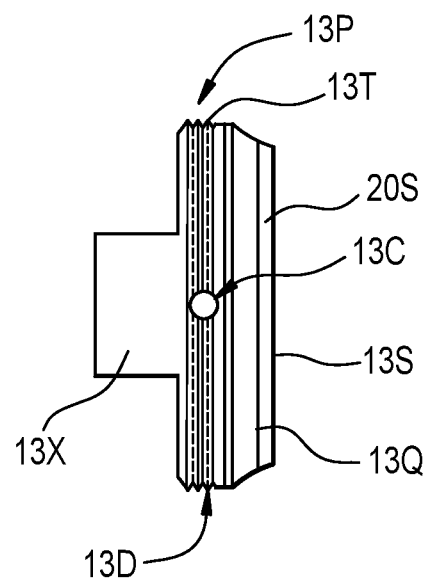
FIG. 8B is a side view of a plug compatible with the joint bushing of FIG. 8A.
Figure 8C:
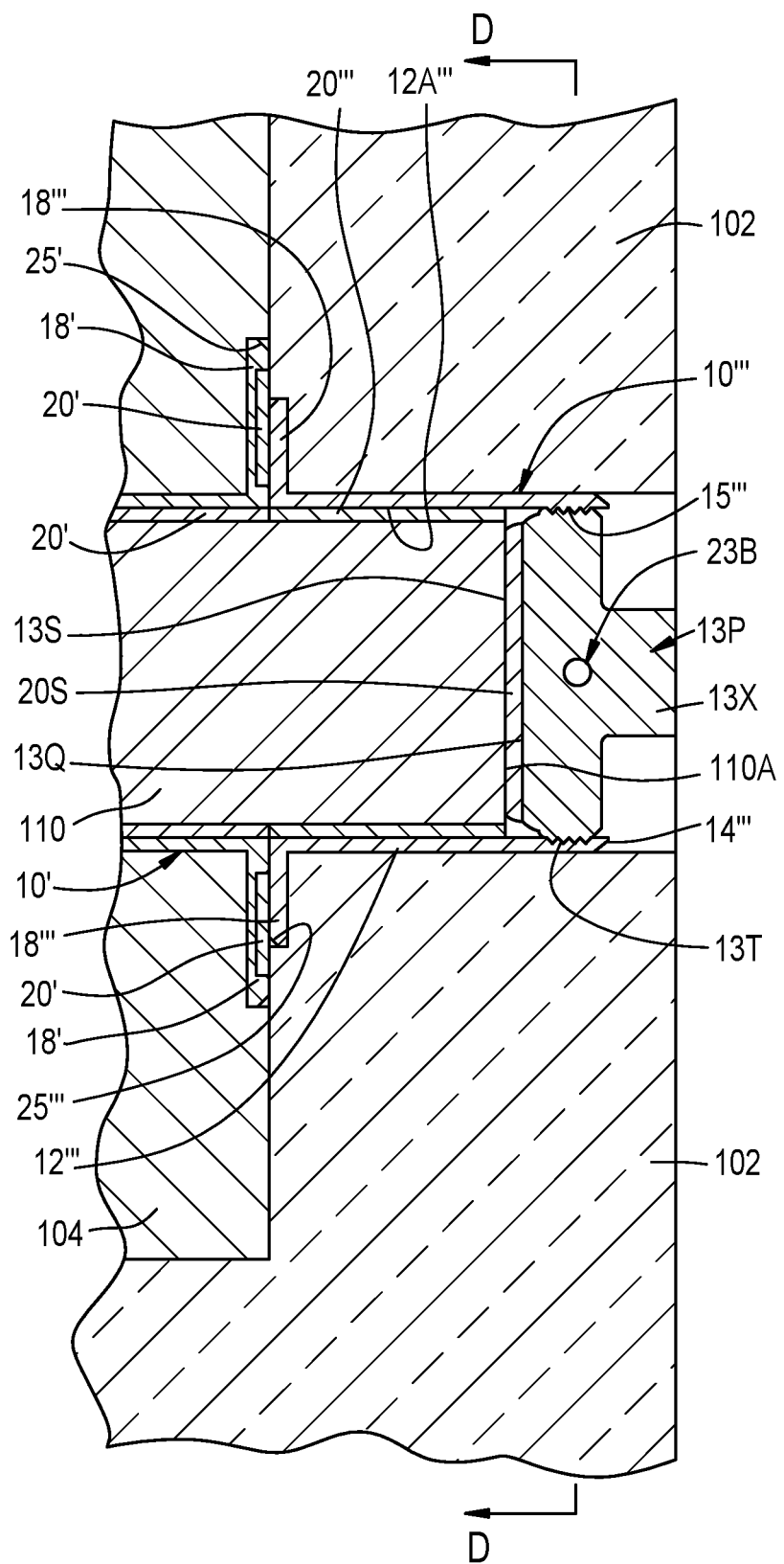
FIG. 8C is a cross sectional view of a portion of the turbine blade incorporating the joint bushing of FIG. 8A and the plug of FIG. 8B.
Figure 8D:
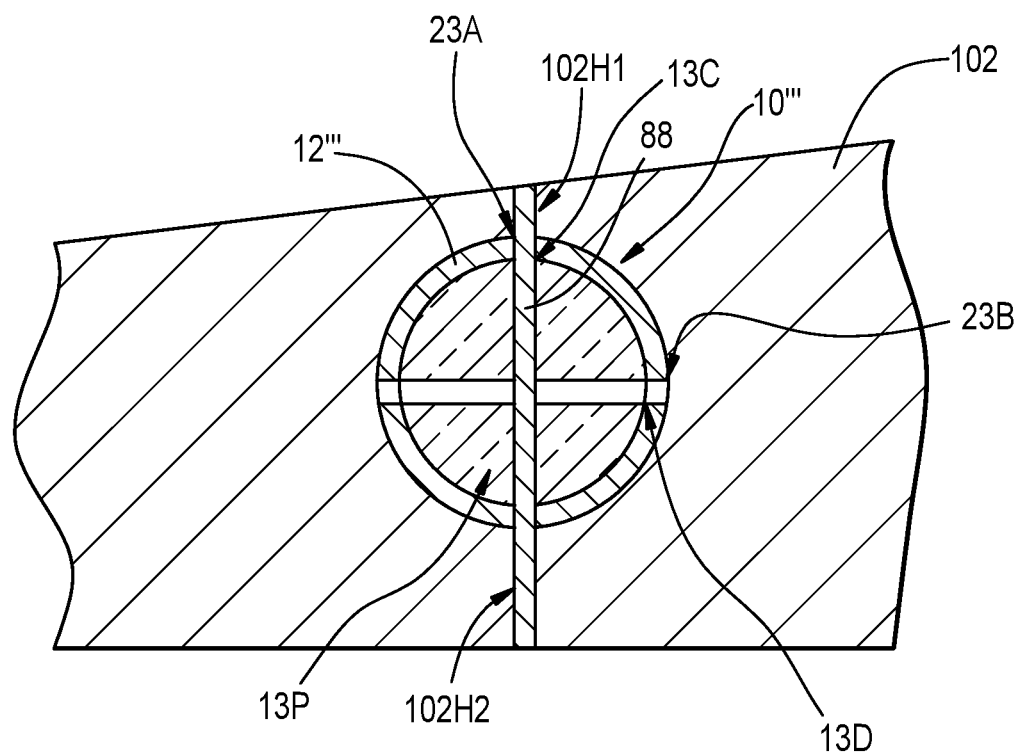
FIG. 8D is a cross sectional view of the portion of the turbine blade of FIG. 8C taken along line D-D.

While the split lock washer 13W, the inner groove 13 and the outer groove 21 are shown to axially retain the first end 110A of the shaft 110, the present disclosure is not limited in this regard, as other axial retaining configurations may be employed, including but not limited to the embodiment depicted in FIGS. 8A-8D, in which the shaft 110 (as depicted in FIG. 8C) is axially retained at the first end 110A by a threaded plug 13P. The inside surface 12A''' of one end 14''' of the tubular segment 12''' of the bushing 10''' defines a threaded end 15'''. The plug 13P inserts into and engages a complementary retention feature in threaded end 15''' to retain the shaft 110 (as depicted in FIG. 8C). Referring to FIG. 8B, an exterior circumferential surface of the threaded plug 13P defines threading 13T, The threaded plug 13P extends between a lubricated surface 13S at one axial end to reduce friction and wear. A protrusion 13X extends from the other axial end. In the embodiment depicted in FIGS. 8A-8D, the lubricated surface 13S is formed by a lubricious liner 20S that is adhered to an axial face 13Q of the plug 13P. The self-lubricating liner 20' extends over the flange 18'. The outer edge of the flange 18' has a chamfer 25', and the outer edge of the flange 18''' has a chamfer 25'''. The chamfers 25', 25''' facilitate alignment of the bushings 10' and 10''' during installment. FIG. 8C1 illustrates the relative motion of the bushings 10' and 10''' during installation. The liner 20S is made from the same material as the self-lubricating liner 20''' to withstand dithering due to oscillatory rotation of the first end 110A of the shaft 110 within the bushing 10'''. The protrusion 13X (e.g., a hex head) eases assembly. In the embodiment depicted in FIGS. 8A-8D, the threaded plug 13P has a first mounting aperture 23A and a second mounting aperture 23B for receiving a locking feature. The plug 13P has a third mounting aperture 13C and a fourth mounting aperture 13D. A pin 88 extends through the first mounting aperture 23A, the third mounting aperture 13C, upper access aperture 102H1 and lower access aperture 102H2 in the first segment 102 (as depicted in FIG. 8D). While the pin 88 is shown, alternate retention means, including but not limited to wire, split pins or cotter pins to retain the threaded plug 13P within the bushing 10''' do not depart from the present disclosure. The lubricated surface 13S of the threaded plug 13P provides an axial guide for a first end 110A of the shaft 110. Specifically, the lubricious liner 20S that is adhered to the axial face 13Q of the plug 13P withstands dithering due to the aforementioned oscillatory rotation of the first end 110A of the shaft 110 within the bushing 10'''.

Figure 4A:
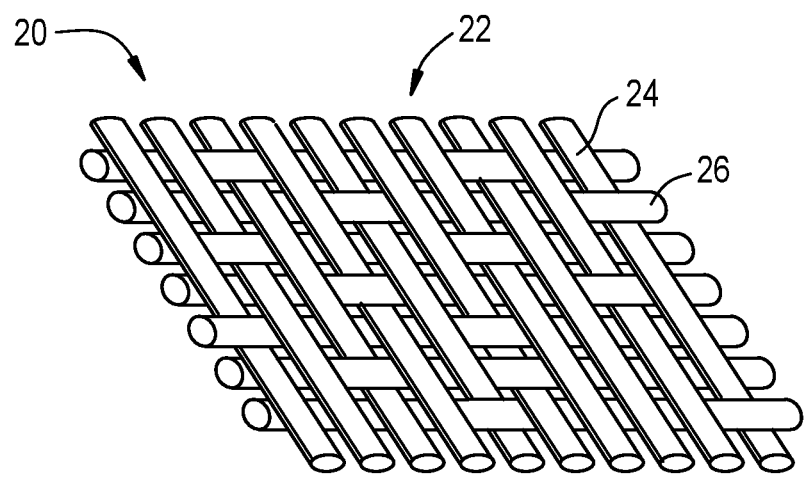
FIG. 4A is an isometric view of a composite system of a self-lubricating liner according to the present disclosure.

Referring to FIG. 4A, the self-lubricating liner 20 includes a composite system incorporating plurality of Polytetrafluoroethylene (PTFE) fibers 24 intermixed (i.e. woven) with structural reinforcement fibers 26 and encapsulated within a polymer matrix 22. The composite system is made (i.e. woven) in such a way to have a high concentration of PTFE fibers 24 on the surface, specifically to accommodate the aforementioned dither. In the example shown in FIG. 4, the PFFE fibers 24 and the structural reinforcement fibers 26 cross at intersections. The PTFE fibers 24 overlay the structural reinforcement fibers 26 on the bearing surface 20X at a majority of the intersections, and the reinforcement fibers overlay the polytetrafluoroethylene fibers on the mounting surface 20Y at a majority of the intersections. In some embodiments, the self-lubricating liner 20 is maintenance free throughout the service life of the bushing 10.

The reinforcement fibers 26 add to the strength and the rigidity of the self-lubricating liner 20 to accommodate stiff compliance and high loads. The reinforcement fibers 26 may be made from, but are not limited to: fiberglass, Dacron®, polyester, cotton, Nomex®, Kevlar®, etc., and combinations of any two or more of the aforementioned materials. In some embodiments, the composite matrix 22 is made from, but is not limited to, a resin system consisting of: polyester, epoxy, phenolic, urethane, polyimide, polyamide, or other suitable resin system and potential additives to enhance composite performance.

In one embodiment, additional lubricating and non-lubricating materials are added to the composite matrix 22 to fulfill certain mechanical or chemical requirements. These additives include but are not limited to: Molybdenum disulfide, Graphite, Carbon Fiber, lead, bronze, PEEK, PFA, FEP, silicon, tungsten disulfide, PVA, etc.

In one embodiment, the self-lubricating liner 20 is of a non-woven nature comprising of PTFE and a polymer matrix with or without reinforcement fibers as a randomly oriented composite structure. The self-lubricating liner 20 is able to be machined into complex shapes as required.

Figure 4B:
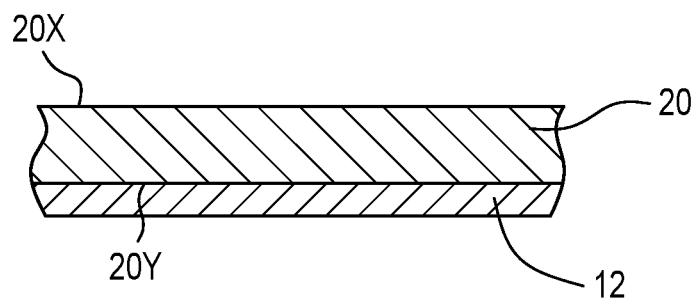
FIG. 4B is a cross sectional view of a self-lubricating liner mounted to a bearing substrate.

In one embodiment, as shown in FIG. 4B, the tubular segment 12 is also of a composite nature, and is integrated with the lubricant continuously. In another embodiment, the tubular segment 12 is a separate and distinct composite structure from the self-lubricating liner 20. In some embodiments, the tubular segment 12 is composed of stainless steel, e.g., corrosion resistant steel ("CRES").

In some embodiments, the tubular segment 12 and/or the composite matrix 22 is made from lesser strength materials for the purposes of low load applications including but not limited to: acetyl (Delrin, POM, etc.), nylon, FEP, PVC, etc.

In one embodiment, the flange 18 has a highly polished stainless steel surface to facilitate mating against the aforementioned self-lubricating liner 20 to allow small rotations and/or translations.

Figure 5:
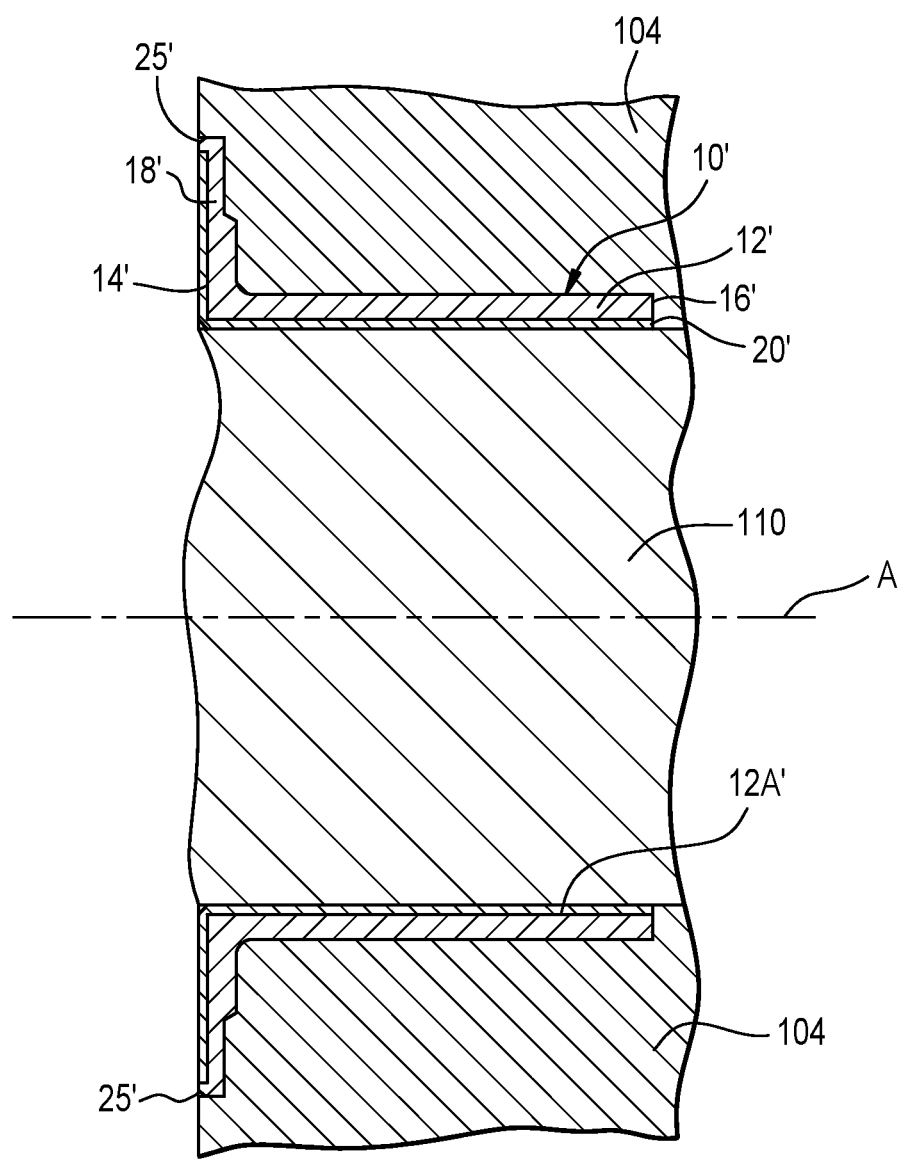
FIG. 5 is a side sectional view of an alternate embodiment of a joint bushing according to the present disclosure.

FIG. 5 depicts an alternate embodiment of the joint bushing 10'. In the depicted embodiment, the inner groove 13 is omitted and the inside surface 12A' of the tubular segment 12' provides a mounting surface for the self-lubricating liner 20' that extends from the second axial end 16', past the first axial end 14' of the tubular segment 12', and over the flange 18'. In some embodiments, a chamfer 25' is formed at an outer edge of the flange 18'. In some embodiments, a separate element, such as a lock ring or locking nut (not depicted) is used in conjunction with the joint bushing 10' to retain the shaft 110.

Figure 6:
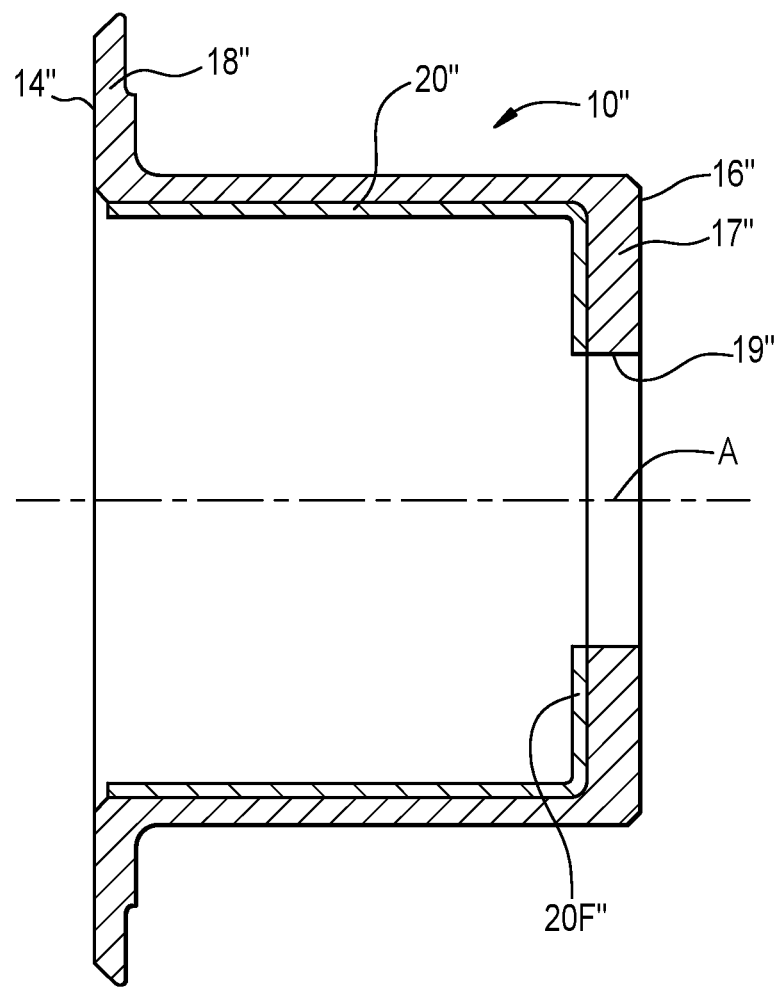
FIG. 6 is a side sectional view of an alternate embodiment of a joint bushing according to the present disclosure.

FIG. 6 depicts an alternate embodiment of the joint bushing 10" that has a first flange 18" at a first axial end 14" and a second flange 17" extending radially inwardly at the second axial end 16" towards the central axis A. The inwardly directed second flange 17" defines a mounting aperture 19". In some embodiments, this mounting aperture 19" accommodates the shaft 110 (not shown in FIG. 6). In some embodiments, the mounting aperture 19" is used for additional pin retention and/or to facilitate the removal of the pin after installation. In some embodiments, a portion 20F" of the self-lubricating liner 20" covers the second flange 17" to protect against wear from dithering.

Figure 7:
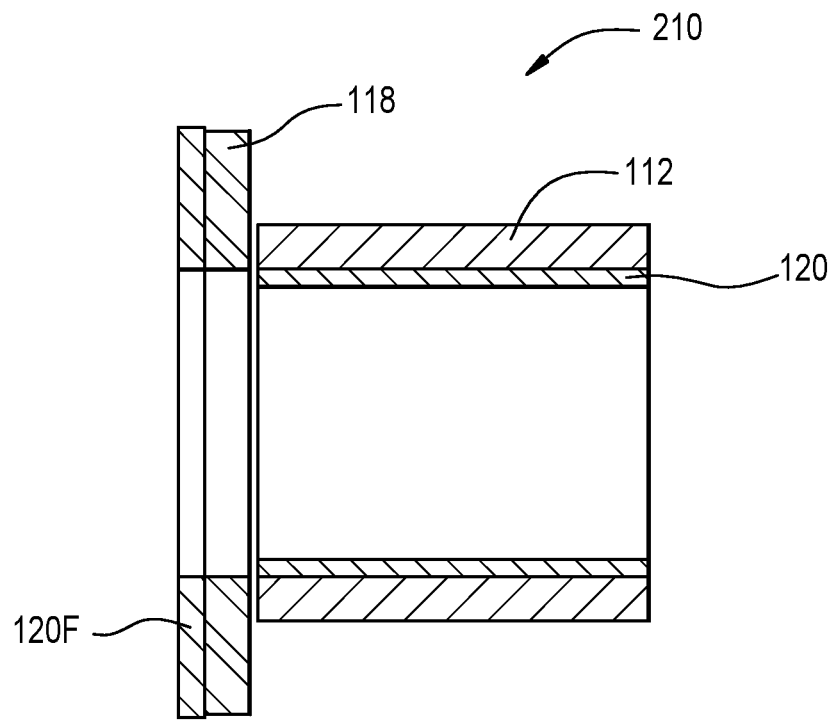
FIG. 7 is a cross sectional view of a straight bushing and separate thrust washer.

In some embodiments, as shown in FIG. 7, the joint bushing 210 includes a straight bushing 112, a self-lubricating liner 120, and a thrust component 118 (e.g., a thrust washer). The straight bushing 112 is separate from the thrust component 118 that replaces the flange 18 depicted in FIG. 2. In some embodiments, a portion 120F of self-lubricating liner covers the washer 118. In some embodiments, the joint bushing 210 is utilized in lieu of the joint bushing 10.

In some embodiments, relief grooves or slots are incorporated into the bushing bore to allow for construction debris to fall into the grooves during operation.

In some embodiments, the self-lubricating liner 20, 20', 20", 20'", 120 is bonded or attached to a tubular segment 12 of suitable strength, rigidity, toughness, and corrosion resistance for long life use within the wind turbine structure. In one embodiment, the tubular segment in composed of CRES or stainless steel.

In some embodiments, the self-lubricating liner 20, 20', 20", 20'", 120 is configured to withstand millions of cycles as demonstrated by laboratory testing.

In some embodiments, the use of composite liners utilizing reinforcement fibers 26 to accommodate the natural flexure of the turbine blade, while maintaining tight running clearances and high strength. This configuration allows for dither and changing load direction due to the rotation of the joint.

In some embodiments, the joint bushing 10, 10', 10", 10'", 210 includes spherical bearings to allow for misalignment and resist axial and radial loading.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A segmented wind turbine blade, comprising:
   a first segment having a channel formed at an end of the first segment and forming a first support leg and a second support leg, the first segment having a first support aperture penetrating the first support leg and a second support aperture penetrating the second support leg, the first support aperture being aligned with the second support aperture;
   a second segment having a tongue extending from a first tongue end to a second tongue end of the second segment, wherein the tongue is complementary in shape to the channel, the tongue is disposed in the channel, the tongue comprises a bore extending from the first tongue end to the second tongue end, the first tongue end is disposed proximate the first support leg, and the second tongue end is disposed proximate the second support leg;
   a first bushing comprising a first tubular segment having a first inside surface extending from a first axial end to a second axial end thereof, a first self-lubricating liner having a first mounting surface and a first bearing surface, the first mounting surface being adhered to the first inside surface, a first circumferential groove penetrating the first inside surface and a radially outward extending first flange, the first self-lubricating liner at least partially covering either one or both of the first tubular segment and the first flange, wherein the first bushing is disposed in the first support aperture;
   a second bushing comprising a second tubular segment having a second inside surface extending from a third axial end to a fourth axial end thereof, a second self-lubricating liner having a second mounting surface and a second bearing surface, the second mounting surface being adhered to the second inside surface, and a radially outward extending second flange, wherein the second bushing is disposed in the bore proximate the first tongue end;
   a third bushing comprising a third tubular segment having a third inside surface extending from a fifth axial end to a sixth axial end thereof, a third self-lubricating liner having a third mounting surface and a third bearing surface, the third mounting surface being adhered to the third inside surface, and a radially outward extending third flange, wherein the third bushing is disposed in the bore proximate the second tongue end; and
   a fourth bushing comprising a fourth tubular segment having a fourth inside surface extending from a seventh axial end to and eighth axial end thereof, a fourth self-lubricating liner having a fourth mounting surface and a fourth bearing surface, the fourth mounting surface being adhered to the fourth inside surface, and a fourth flange extending radially inward from the eighth axial end, the self-lubricating liner at least partially covering either one or both of the fourth tubular segment and the fourth flange, wherein the fourth bushing is disposed in the second support aperture,
   wherein a mounting shaft extends through the first support aperture, the bore, and the second support aperture, the mounting shaft has an exterior surface extending from a first end of the mounting shaft disposed in the first bushing to a second end of the mounting shaft disposed in the fourth bushing, a second circumferential groove penetrates the exterior surface of the mounting shaft proximate the first end of the mounting shaft, and the mounting shaft couples the second segment to the first segment, wherein a collapsible ring engages the first circumferential groove and the second circumferential groove to axially secure the first end of the mounting shaft to the first support leg, and the fourth flange engages the second end of the mounting shaft to axially secure the second end of the mounting shaft to the second support leg, and wherein the mounting shaft is retained within the first segment and the second segment by the first bushing, the second bushing, the third bushing, and the fourth bushing.

2. The segmented wind turbine blade of claim 1, wherein the first self-lubricating liner includes polytetrafluoroethylene fibers woven together with structural reinforcement fibers such that the polytetrafluoroethylene fibers overlay the structural reinforcement fibers on the first bearing surface at a majority of intersections, and the structural reinforcement fibers overlay the polytetrafluoroethylene fibers on the first mounting surface at a majority of the intersections.

3. The segmented wind turbine blade of claim 1, wherein the collapsible ring is a split lock washer.

4. The segmented wind turbine blade of claim 1, wherein the fourth bushing further comprises a radially outward extending fifth flange, and the fourth self-lubricating liner at least partially covers the fifth flange.

5. A segmented wind turbine blade, comprising:
a first segment having a channel formed at an end of the first segment and forming a first support leg and a second support leg, the first segment having a first support aperture penetrating the first support leg and a second support aperture penetrating the second support leg, the first support aperture being aligned with the second support aperture;
a second segment having a tongue extending from a first tongue end to a second tongue end of the second segment, wherein the tongue is complementary in shape to the channel, the tongue is disposed in the channel, the tongue comprises a bore extending from the first tongue end to the second tongue end, the first tongue end is disposed proximate the first support leg, and the second tongue end is disposed proximate the second support leg;
a first bushing comprising a first tubular segment having a first inside surface extending from a first axial end to a second axial end thereof, a first self-lubricating liner having a first mounting surface and a first bearing surface, the first mounting surface being adhered to the first inside surface, a first circumferential groove penetrating the first inside surface, and a radially outward extending first flange, wherein the first bushing is disposed in the first support aperture;
a second bushing comprising a second tubular segment having a second inside surface extending from a third axial end to a fourth axial end thereof, a second self-lubricating liner having a second mounting surface and a second bearing surface, the second mounting surface being adhered to the second inside surface, and a radially outward extending second flange, wherein the second bushing is disposed in the bore proximate the first tongue end;
a third bushing comprising a third tubular segment having a third inside surface extending from a fifth axial end to a sixth axial end thereof, a third self-lubricating liner having a third mounting surface and a third bearing surface, the third mounting surface being adhered to the third inside surface, and a radially outward extending third flange, wherein the third bushing is disposed in the bore proximate the second tongue end; and a fourth bushing comprising a fourth tubular segment having a fourth inside surface extending from a seventh axial end to an eighth axial end thereof, a fourth self-lubricating liner having a fourth mounting surface and a fourth bearing surface, the fourth mounting surface being adhered to the fourth inside surface, and a radially outward extending fourth flange, wherein the fourth bushing is disposed in the second support aperture, wherein a mounting shaft extends through the first support aperture, the bore, and the second support aperture, the mounting shaft has an exterior surface extending from a first end of the mounting shaft disposed in the first bushing to a second end of the mounting shaft disposed in the fourth bushing, a second circumferential groove penetrates the exterior surface of the mounting shaft proximate the first end of the mounting shaft, and the mounting shaft couples the second segment to the first segment, wherein a collapsible ring engages the first circumferential groove and the second circumferential groove to axially secure the first end of the mounting shaft to the first support leg, and the fourth bushing engages the second end of the mounting shaft to axially secure the second end of the mounting shaft to the second support leg, and wherein the mounting shaft is retained within the first segment and the second segment by the first bushing, the second bushing, the third bushing, and the fourth bushing.

6. The segmented wind turbine blade of claim 5, wherein the first self-lubricating liner covers at least part of the first flange.

7. The segmented wind turbine blade of claim 5, wherein the second self-lubricating liner covers at least part of the second flange.

8. The segmented wind turbine blade of claim 5, wherein the third self-lubricating liner covers at least part of the third flange.

9. The segmented wind turbine blade of claim 5, wherein the fourth self-lubricating liner covers at least part of the fourth flange.

10. The segmented wind turbine blade of claim 5, wherein the first self-lubricating liner covers at least part of the first flange, and the fourth self-lubricating liner covers at least part of the fourth flange.

11. The segmented wind turbine blade of claim 5, wherein the second self-lubricating liner covers at least part of second flange, and the third self-lubricating liner covers at least part of the third flange.

12. The segmented wind turbine blade of claim 5, wherein the fourth bushing further comprises a fifth flange extending radially inward from the eighth axial end, and the fifth flange engages the second end of the mounting shaft to axially secure the second end of the mounting shaft to the second support leg.

13. A segmented wind turbine blade, comprising:
a first segment having a channel formed at an end of the first segment and forming a first support leg and a second support leg, the first segment having a first support aperture penetrating the first support leg and a second support aperture penetrating the second support leg, the first support aperture being aligned with the second support aperture;

a second segment having a tongue extending from a first tongue end to a second tongue end of the second segment, wherein the tongue is complementary in shape to the channel, the tongue is disposed in the channel, the tongue comprises a bore extending from the first tongue end to the second tongue end, the first tongue end is disposed proximate the first support leg, and the second tongue end is disposed proximate the second support leg;

a first bushing comprising a first tubular segment having a first inside surface extending from a first axial end to a second axial end thereof, a first self-lubricating liner having a first mounting surface and a first bearing surface, the first mounting surface being adhered to the first inside surface, a first circumferential groove penetrating the first inside surface, and a radially outward extending first flange, wherein the first bushing is disposed in the first support aperture;

a second bushing comprising a second tubular segment having a second inside surface extending from a third axial end to a fourth axial end thereof, a second self-lubricating liner having a second mounting surface and a second bearing surface, the second mounting surface being adhered to the second inside surface, and a radially outward extending second flange, the second self-lubricating liner covering at least part of the second flange, wherein the second bushing is disposed in the bore proximate the first tongue end;

a third bushing comprising a third tubular segment having a third inside surface extending from a fifth axial end to a sixth axial end thereof, a third self-lubricating liner having a third mounting surface and a third bearing surface, the third mounting surface being adhered to the third inside surface, and a radially outward extending third flange, the third self-lubricating liner covering at least part of the third flange, wherein the third bushing is disposed in the bore proximate the second tongue end; and a fourth bushing comprising a fourth tubular segment having a fourth inside surface extending from a seventh axial end to an eighth axial end thereof, a fourth self-lubricating liner having a fourth mounting surface and a fourth bearing surface, the fourth mounting surface being adhered to the fourth inside surface, a radially outward extending fourth flange, and a fifth flange extending radially inward from the eighth axial end, wherein the fourth bushing is disposed in the second support aperture, wherein a mounting shaft extends through the first support aperture, the bore, and the second support aperture, the mounting shaft has an exterior surface extending from a first end of the mounting shaft disposed in the first bushing to a second end of the mounting shaft disposed in the fourth bushing, a second circumferential groove penetrates the exterior surface of the mounting shaft proximate the first end of the mounting shaft, and the mounting shaft couples the second segment to the first segment, wherein a collapsible ring engages the first circumferential groove and the second circumferential groove to axially secure the first end of the mounting shaft to the first support leg, and the fifth flange engages the second end of the mounting shaft to axially secure the second end of the mounting shaft to the second support leg, and wherein the mounting shaft is retained within the first segment and the second segment by the first bushing, the second bushing, the third bushing, and the fourth bushing.

14. The segmented wind turbine blade of claim 13, wherein there is no self-lubricating liner on the first flange.

15. The segmented wind turbine blade of claim 13, wherein there is no self-lubricating liner on the fourth flange.

* * * * *